United States Patent
Sharma et al.

(10) Patent No.: US 9,501,096 B2
(45) Date of Patent: Nov. 22, 2016

(54) DISPLAY POSITIONING SYSTEM

(71) Applicant: Tangible Play, Inc., San Jose, CA (US)

(72) Inventors: Pramod Kumar Sharma, San Jose, CA (US); Jerome Scholler, San Francisco, CA (US)

(73) Assignee: Tangible Play, Inc., San Jose, CA (US)

( * ) Notice: Subject to any disclaimer, the term of this patent is extended or adjusted under 35 U.S.C. 154(b) by 68 days.

(21) Appl. No.: 14/670,359

(22) Filed: Mar. 26, 2015

(65) Prior Publication Data

US 2016/0282901 A1    Sep. 29, 2016

(51) Int. Cl.
*A47B 91/00* (2006.01)
*G06F 1/16* (2006.01)

(52) U.S. Cl.
CPC .................................. *G06F 1/1613* (2013.01)

(58) Field of Classification Search
CPC .... G06F 1/1613; G06F 1/1637; H04M 1/04; A47B 23/00
USPC ................ 248/188.8, 188.1, 346.01, 346.03, 248/346.06, 688; 455/575.1; 379/454, 455; 361/679.3
See application file for complete search history.

(56) References Cited

U.S. PATENT DOCUMENTS

| | | | | |
|---|---|---|---|---|
| 8,490,846 B1 * | 7/2013 | Wheatley | ................ | B60R 11/02 224/277 |
| 8,608,123 B2 * | 12/2013 | Takahashi | ................ | H04M 1/04 248/346.01 |
| 8,667,904 B2 * | 3/2014 | Pajic | ...................... | A47B 23/00 108/25 |
| 2006/0168865 A1 * | 8/2006 | Watanabe | ............... | F16M 11/00 40/745 |
| 2010/0320349 A1 | 12/2010 | Necessary | | |
| 2013/0068917 A1 | 3/2013 | Peng | | |
| 2013/0277520 A1 | 10/2013 | Funk et al. | | |
| 2014/0319304 A1 * | 10/2014 | Kuan | ................. | F16M 11/2021 248/454 |
| 2014/0321043 A1 | 10/2014 | Liu et al. | | |
| 2015/0339532 A1 * | 11/2015 | Sharma | ................. | A63F 13/213 345/633 |

FOREIGN PATENT DOCUMENTS

KR    1020130133627 A    12/2013

OTHER PUBLICATIONS

International Search Report and Written Opinion issued in PCT/US2016/024303, mailed Aug. 3, 2016 (11 pages).

* cited by examiner

*Primary Examiner* — Todd M Epps
(74) *Attorney, Agent, or Firm* — Patent Law Works LLP

(57) ABSTRACT

The present disclosure relates to technology for positioning a display for interaction and/or virtualization of tangible interface objects. According to an example embodiment, a display positioning system includes a display stand including a positioning portion having a recess, supports connected to the positioning portion, and an insert. The supports are configured to cooperatively support the positioning portion when situated on a support surface. The insert may include an elongated body configured to slidably insert into the recess, the recess may be configured to receive and removably retain the insert, the insert and recess being correspondingly shaped. The elongated body may include an upwardly facing surface having a concavity shaped to receive and removably retain at least an edge portion of a computing device display when the insert is inserted into the recess of the display stand and equipped with the computing device display.

38 Claims, 9 Drawing Sheets

DISPLAY POSITIONING SYSTEM

BACKGROUND

The present disclosure relates to, for example, technology for positioning a display and/or virtualization of tangible interface objects.

A tangible user interface is a physical environment that a user can physically interact with to manipulate digital information. While the tangible user interface has opened up a new range of possibilities for interacting with digital information, significant challenges remain when implementing such an interface. For instance, existing systems require dedicated, expensive, specialized equipment to capture and digitize user interactions with this environment, which results in these systems being too expensive for most consumers. Similarly, while various display mounts and supports exist, they are not typically well suited to supporting a variety of displays or supporting the displays in a proper manner to facilitate the virtualization of tangible interface objects.

SUMMARY

According to one innovative aspect of the subject matter in this disclosure, a display positioning system comprises a display stand including a positioning portion and supports connected to the positioning portion, the supports configured to cooperatively support the positioning portion when situated on a support surface, the positioning portion having a first recess. The display positioning system may also comprise a first insert including an elongated body configured to slidably insert into the first recess, the first recess configured to receive and removably retain the first insert and the first insert and the first recess being correspondingly shaped, the elongated body of the first insert including an upwardly facing surface having a first concavity shaped to receive and removably retain at least an edge portion of a first computing device display when the first insert is inserted into the first recess of the display stand and equipped with the first computing device display.

In addition, various implementations of the display positioning system may further optionally include one or more of the following features: that the upwardly facing surface includes a front inclined surface and a rear inclined surface extending adjacently from a proximal portion of the elongated body to a distal portion of the elongated body, the front inclined surface and rear inclined surface facing away from one another, that the front inclined surface includes the first concavity, a self-aligning mechanism configured to automatically align the elongated body of the first insert within the first recess of the display stand when inserted, that the self-aligning mechanism includes an elongated slot disposed in the upwardly facing surface of the elongated body, the first recess includes a protrusion, and the elongated slot is configured to mate with the protrusion when the first insert is inserted into the first recess, that a surface of the first concavity includes multiple contours configured to receive and removably retain differently shaped computing device displays, that the upwardly facing surface has a second concavity situated adjacent to the first concavity, the second concavity being configured to receive and removably retain a differently shaped computing device display than the first computing device display, that the first insert is reversible such that either the first concavity or the second concavity may be positioned to receive and removably retain the edge portion of the first computing device display when the first insert is inserted into the positioning portion, that a proximal portion of the elongated body is configured to be contiguous with an outer surface of the display stand when the first insert is completely inserted into the first recess, a manually actuateable ejector for ejecting the first insert from the first recess, that the positioning portion includes a first housing including a first surface having the first recess, the first recess extending into the first housing and the first housing accommodating the first insert when slidably inserted into the first housing via the first recess, that the positioning portion includes a second surface on a side of the positioning portion opposite of the first surface, the second surface having a second recess configured to receive and removably retain a correspondingly shaped second insert having a second retainer configured to receive and removably retain at least a second edge portion of the first computing device display, that the positioning portion includes a first housing and a second housing positioned adjacently, the first housing including a first surface on a first side and the second housing including the second surface on a second side, the first side and the second side being opposite sides of the positioning portion, and the first surface having the first recess, that the positioning portion includes a channel formed between the first housing and the second housing, a bottom surface of the channel connecting the first housing and the second housing, that the bottom surface of the channel includes a cable aperture configured to pass through a cable that connects to the first computing device display, the positioning portion further includes a second recess configured to receive and removably retain the first insert, and that the positioning portion is elongated along a first axis, the first recess extends into a first surface along the first axis, the supports include a front support elongated along the first axis and connected to a front side of the positioning portion, and a rear support elongated along the first axis and connected to and extending outwardly from a rear side of the positioning portion.

A further innovative aspect of the subject matter may generally include an insert comprising an elongated body configured to slidably insert into a correspondingly shaped recess included in a surface of a display stand, the elongated body of the first insert including an upwardly facing surface and at least a portion of the upwardly facing surface having a first concavity shaped to receive and removably retain at least an edge portion of a first computing device display when the insert is inserted into the recess of the display stand and equipped with the first computing device display.

In addition, various implementations of the insert may further optionally include one or more of the following features: that the upwardly facing surface includes a front inclined surface and a rear inclined surface extending adjacently from a proximal portion of the elongated body to a distal portion of the elongated body, the front inclined surface and the rear inclined surface facing away from one another, the front inclined surface or the rear inclined surface includes the first concavity, that the front inclined surface and the rear inclined surface meet along a ridge of the upwardly facing surface, a self-aligning mechanism configured to automatically align the elongated body of the insert within the recess of the display stand when inserted, that the self-aligning mechanism includes an elongated slot disposed in the upwardly facing surface of the elongated body and configured to mate with a corresponding protrusion of the display stand, that a surface of the first concavity includes multiple contours configured to receive and removably retain differently shaped computing device displays, that the upwardly facing surface has a second concavity situated adjacent to the first concavity, the second concavity being configured to receive and removably retain a differently shaped computing device display than the first computing device display, that a proximal portion of the elongated body is configured to be contiguous with an outer surface of the display stand when the insert is completely inserted into the recess, a manually actuateable ejector for ejecting the insert from the recess, and that the ejector comprises an indentation formed in a surface of the elongated body.

Yet another innovative aspect of the subject matter may generally include a stand for positioning a computing device display on a support surface comprising a positioning portion including a first surface having a first recess configured to receive and removably retain a correspondingly shaped first insert having a first concavity configured to receive and removably retain at least a first edge portion of the first computing device display and supports connected to the positioning portion and configured to cooperatively support the positioning portion when situated on the support surface.

In addition, various implementations of the stand may further optionally include one or more of the following features: that the positioning portion includes a first housing including the first surface, the first recess extending into the first housing and the first housing accommodating the first insert when slidably inserted into the first housing via the first recess, that the positioning portion includes a second surface on a side of the positioning portion opposite of the first surface, the second surface having a second recess configured to receive and removably retain a correspondingly shaped second insert having a second concavity configured to receive and removably retain at least a second edge portion of the first computing device display, that the positioning portion includes a first housing and a second housing positioned adjacently, the first housing including the first surface on a first side and the second housing including the second surface on a second side, the first side and the second side being opposite sides of the positioning portion, that the positioning portion includes a channel formed between the first housing and the second housing, a bottom surface of the channel connecting the first housing and the second housing, that the bottom surface of the channel includes a cable aperture configured to pass through a cable that connects to the first computing device display, that the channel embodies a camera adapter receiver for receiving and magnetically retaining a magnetic camera adapter, that at least one surface of one or more of the first housing, the second housing, and the bottom surface forming the channel includes a magnetic material configured to magnetically couple with a corresponding magnetic material included in the camera adapter, that the positioning portion is elongated along a first axis, the first recess extends into the first surface along the first axis, the supports include a front support elongated along the first axis and connected to a front side of the positioning portion, and a rear support elongated along the first axis and connected to and extending outwardly from a rear side of the positioning portion, and that the positioning portion includes a manually actuateable ejector for ejecting the insert from the recess.

Numerous features and advantages of these and other aspects are described throughout this disclosure. However, it should be understood, that the features and advantages described herein are not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The technology described herein includes a display positioning system for supporting and positioning a display at a convenient angle on a support surface. In some embodiments, the display positioning system may augment a handheld computing device, such as a phone or tablet, with novel hardware accessories to make use of a built-in video camera on the computing device. For example, the display positioning system may support a display in a convenient position and adapt the field of view of a camera (e.g., attached to the display) to include the surface in front of the display. As such, the display positioning system may enable a platform for virtualizing a physical environment of tangible interface (TI) objects (two or three-dimensional objects recognizable by recognition algorithms and manipulatable by a user), although numerous other implementations and configurations of the display positioning system are contemplated and described herein.

While the display positioning system may be used merely to support a display in a convenient position, it may also yield numerous advantages including, but not limited to, providing a low-cost alternative for developing a nearly limitless range of applications that blend both physical and digital mediums by reusing existing hardware (e.g., a computing device, camera, etc.) and leveraging detection and recognition algorithms to detect and process TI objects or TI interactions, thus providing a tangible-virtual interaction experience. Additionally, the display positioning system is intuitive to setup and use even for young users (e.g., 3+ years old).

Figure 1:
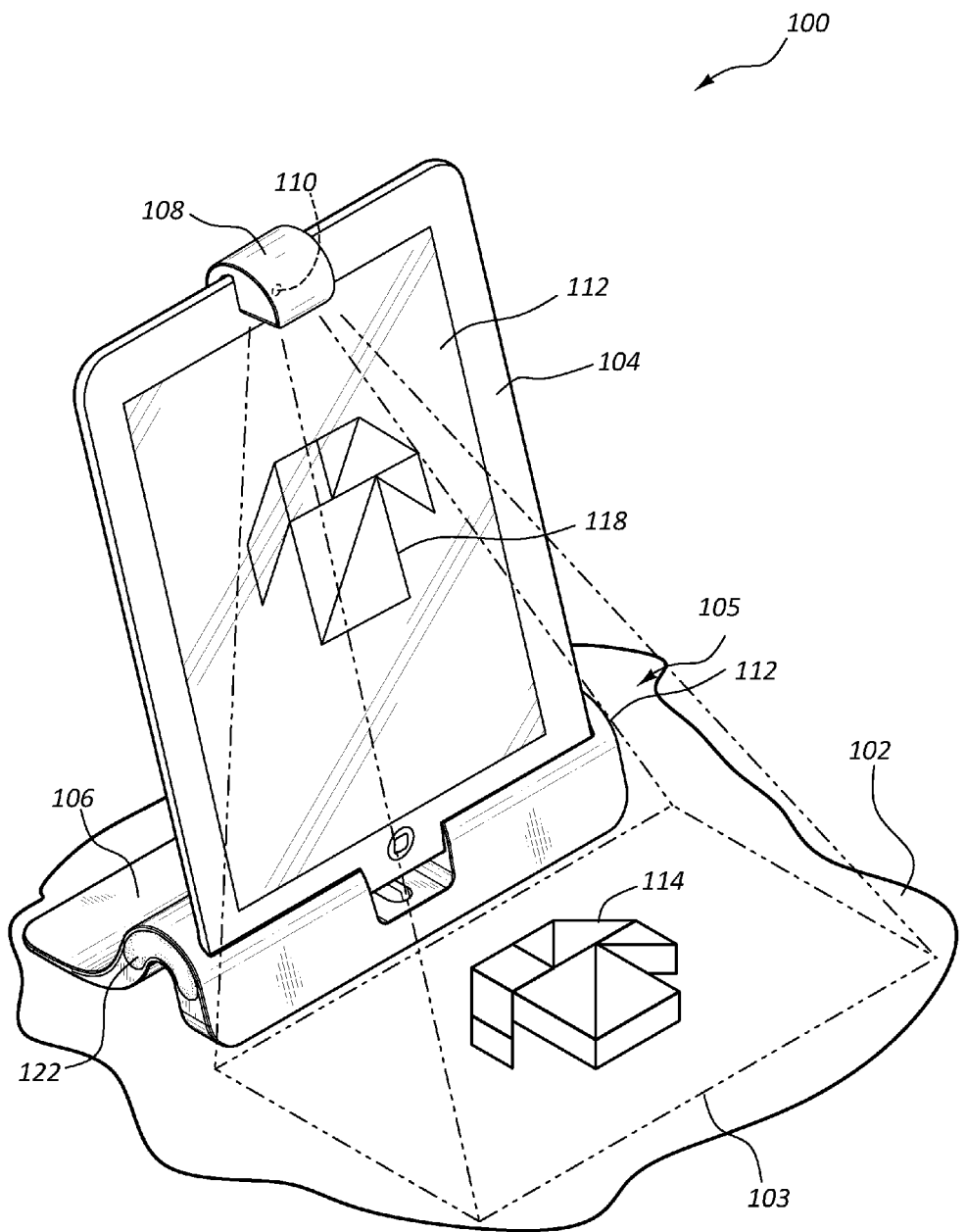
FIG. 1 illustrates a perspective view of an example scenario where an example display positioning system is equipped with an example computing device display.
Figure 2:
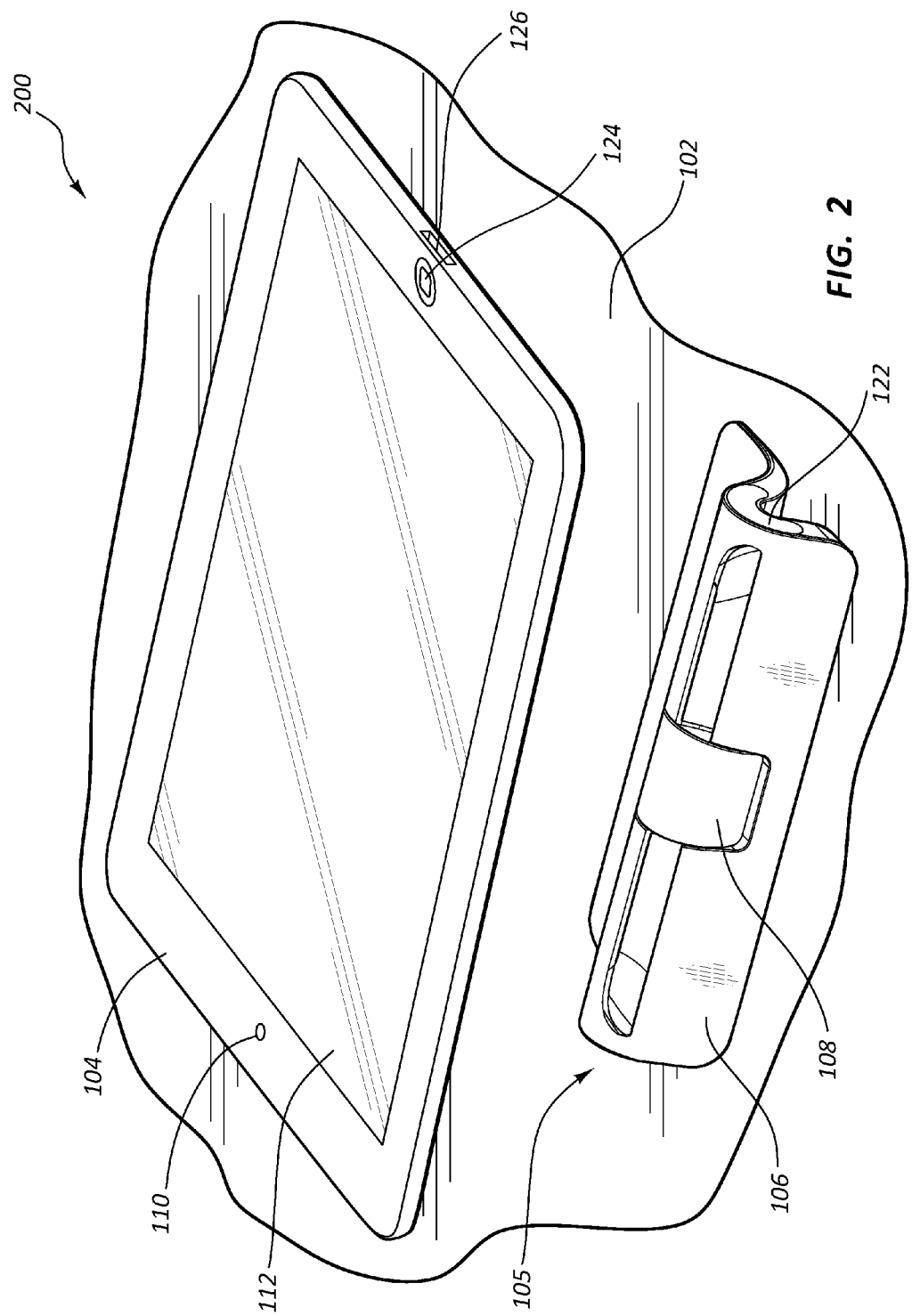
FIG. 2 illustrates a perspective view of an example scenario the example computing device display is removed from the example display positioning system.
Figure 3:
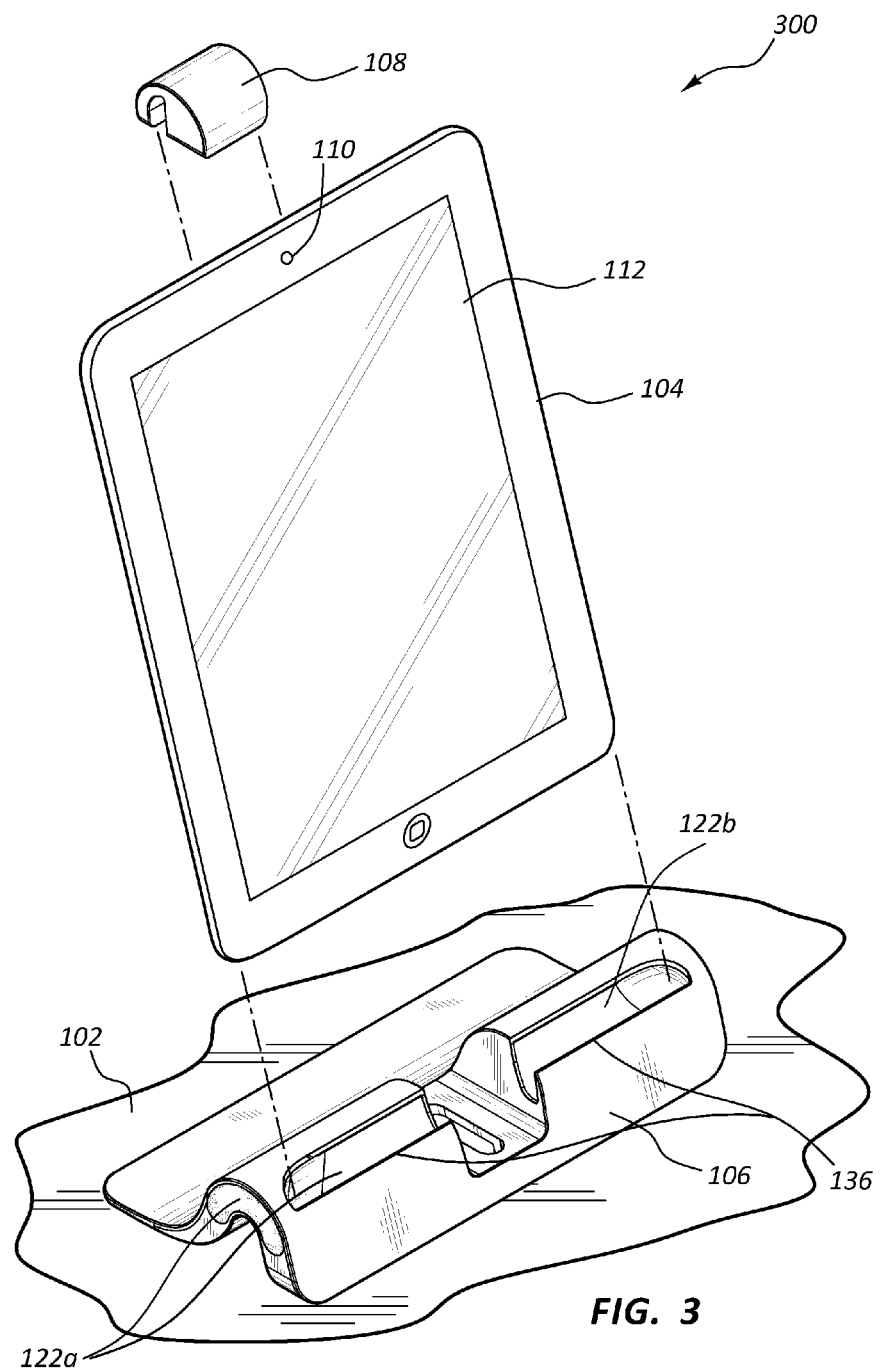
FIG. 3 illustrates a perspective view of an example scenario where the example display positioning system is being equipped with the example computing device display.

FIGS. 1-3 depict various scenarios including an example display positioning system 105 and an example computing device display 104. In particular, FIG. 1 illustrates a perspective view of an example scenario where an example display positioning system is equipped with an example computing device display, FIG. 2 illustrates a perspective view of an example scenario the example computing device display 104 is removed from the example display positioning system, and FIG. 3 illustrates a perspective view of an example scenario where the example display positioning system is being equipped with the example computing device display.

Although FIGS. 1-3 depict a computing device display 104 positioned in a portrait orientation with a camera 110 positioned along a top edge of the computing device display 104, it should be understood that other configurations are possible and contemplated by this disclosure. For example, in some embodiments, the computing device display 104 may be supported by the display positioning system 105 in a landscape orientation with a camera 110 positioned along a long edge (e.g., a top edge) of the computing device display 104. In some embodiments, the computing device display 104 may be supported by the display positioning system 105 in either a portrait or landscape orientation and the adapter 108 may be configured to adapt the field of view of a camera 110 positioned along either a horizontal or a vertical edge of the computing device display 104. In further examples, the camera 110 could be located on the back of the computing device display 104, or be separate from but coupled to (e.g., wired, wirelessly, etc.) the computing device display 104. Other variations are also possible and contemplated.

As shown in FIGS. 1-3, the display positioning system 105 may be placed on a support surface 102 and configured to support (e.g., receive, retain, removably retain, hold, position, etc.) the computing device display 104. One or more inserts 122 may connect to (e.g., be received within, rest on top of, etc.) the stand 106 and, in combination with the stand, support the computing device display 104. In some embodiments, the insert(s) 122 may slide horizontally into the stand 106, although it should be understood that an insert 122 may also be inserted from the bottom, top, or other sides of the stand 106 or even formed within the stand 106.

The computing device display 104 may be, include, wirelessly and electronically coupled to, etc., a computer having one or more applications (e.g., stored on a memory and executable by a processor of the computer) coupled to the camera 110 and configured to recognize tangible objects 114 (e.g., blocks, cards, toys, drawings, or any other non-virtual object recognizable by an image capture device), create a virtual environment 118 on the screen 112, and allow the user to interact the virtual environment 118 via the tangible interface objects 114. For example, the computing device display 104 may include a detection engine implemented in software and/or hardware and executable by a computer of the computing device display 104 for calibrating the camera 110 and detecting, analyzing, and determining the identity of tangible objects (e.g., the tangible interface object 114) and actions (e.g., motion, placement, or modification of the tangible objects). The detection engine may also expose the tangible objects to an activity application, which may be operable to generate rich virtual environments incorporating the tangible objects or actions relating to them.

The display positioning system 105 may include a computing device stand 106 (the computing device stand 106 may be referred to for convenience herein simply as the "stand" or "display stand") equipable with a computing device display 104, one or more inserts 122 (shown inserted into the stand 106) for accommodating and removably retaining the computing device display 104, and/or a camera adapter 108 (also referred to herein as "camera adapter" or simply "adapter") for augmenting/adapting the field of view of a camera of display device positioned by the display positioning system 100.

The computing device display 104 included in the example scenario 100, 200, and 300 may be situated on or otherwise proximate to a support surface 102 (also referred herein to simply as surface). The computing device display 104 can provide user(s) with a virtual portal for visualizing the TI objects being manipulated by the user. For example, the computing device display 104 may be placed on a surface 102 (e.g., a table) in front of a user so the user can easily see the computing device display 104 while interacting with different TI objects placed on the surface 102.

The computing device display 104 includes or is otherwise coupled to (e.g., via a wireless or wired connection) a video capture device 110 (also referred to herein as a camera) for capturing a video stream of the surface 102. As depicted in FIGS. 1-3, the video capture device 110 may be a front-facing camera and may equipped with an adapter 108 that adapts the field of view of the camera 110 to include, at least in part, the surface 102. For clarity, the portion 103 of the surface 102 captured by the video capture device 110 is also interchangeably referred to herein as the activity surface or the field of view. The stand 106 and inserts 122 are configured to stably support the computing device display 104 in a vertical or angled position in order to provide a convenient screen 112 viewing experience for a user and, in some instances, to elevate a camera 110 connected to the computing device display 104 above the surface 102. In some embodiments, the stand 106 and inserts 122 together are configured to support the computing device display 104 so that the screen 112 is situated at a certain angle relative to a vertical plane extending perpendicular from the surface 102. For example, as depicted, the stand 106 and inserts 122 support the computing device display 104, and thus screen 112, in a reclining position (e.g., 1-45 degrees, and more particularly, 5, 10, 15, etc. degrees, from a hypothetical vertical plane directly in front of the screen 112/a front surface of the computing device display 104).

The adapter 108 is configured to adapt the field of view of a camera 110, and may work together with the stand 106 and insert(s) 122, to configure the camera to view and capture a certain area of the surface 102. The area 103 illustrates an example embodiment of activity surface seen in the field of view of a camera 110. For example, the line of sight of the camera 110, as illustrated in FIG. 1, would ordinarily extend normal to the screen 112. However, in the illustrated embodiment, the adapter 108 has adapted the field of view to cover a larger and/or more proximate area of the surface 102. It should be noted that the area 103 is presented merely as example and that the actual field of view may be larger, smaller, positioned differently, or shaped differently than that illustrated in FIG. 1. For example, in some embodiments, the adapter 108 can split the field of view of the front-facing camera into two scenes, such as an activity surface 103 as well as a user scene (not shown) that includes the user.

The stand 106 and the insert(s) 122 may be configured to support the computing device display 104 without extending out in front of the display, in order to not interfere with the field of view of the camera 110. In other words, the stand 106 and the insert(s) 122 may be configured to allow the area 103 and field of view to be directly in front of the display. The area 103 may include one or more TI objects 114, which may be supported on or above the surface 102 or they may be integral to the surface 102.

While the surface 102 is depicted as substantially horizontal in FIGS. 1-3, it should be understood that it can be vertical or positioned at any other angle suitable to user interaction. The surface 102 can have any color, pattern, texture, and topography. For instance, the surface 102 can be substantially flat or be disjointed/discontinuous in nature. Non-limiting examples of a surface 102 include a table, desk, counter, ground, a wall, a whiteboard, a chalkboard, a customized surface, a game board, etc.

In some implementations, the surface 102 may be preconfigured for certain activities. For instance, the surface 102 may constitute or include the board of a board game. A board may be integrated or distinct from the stand 106 and may indicate to a user the boundaries of the activity surface. The board may include a pattern that coincides with an application operable on the computing device display 104. In some instances, the size of the interactive area on a board may be bounded by the field of view of the camera 110 and can be adapted by the adapter 108 and/or by adjusting the position of the camera 110. In additional examples, a board may be a light projection (e.g., pattern, context, shapes, etc.) projected onto the surface 102.

As shown, the computing device display 104 may include a screen 112 and a camera 110, although it should be understood that the computing device display 104 may include other components, such as one or more buttons 124, one or more connectors/ports 126 (e.g., for connecting data or power cables), one or more processors, a memory, other electronic components such as a computer bus, power source (e.g., battery, etc.), wired and/or wireless network interfaces, a keyboard, a pointing device, a microphone, etc. In addition, while the computing device display 104 is shown as integrating the screen 112, the camera 110, etc., it should be understood that one or more components could be separate.

In some embodiments, the computing device display may be or be associated with a smart phone, a tablet, a laptop, a desktop, a netbooks, a TV, a monitor, a set-top box, a media streaming device, etc. For instance, as shown, the computing device display 104 may be a tablet computer. In a further example, the computing device display 104 may be a computer monitor connected to a separate computing system. Other variations are also possible.

The screen 112 may display electronic images and data output by the computing device display 104 for presentation to a user. The screen 112 may include any conventional display device, monitor or screen, including, for example, an organic light-emitting diode (OLED) display, a liquid crystal display (LCD), etc. The screen 112 may be a touch-screen display capable of receiving input from one or more fingers of a user.

The camera 110 (e.g., any image or video capture device) could, in some embodiments, be an independent unit that is distinct from the computing device display 104 and may be positionable to capture the activity surface 103 or may be adapted by the adapter 108 to capture the activity surface 103 as discussed above. In these implementations, the video capture device 110 may be communicatively coupled via a wired or wireless connection to the computing device display 104 to provide it with the video stream being captured.

In FIG. 3, the computing device display 104 may be inserted into one or more openings 136 in a stand 106 and an adapter 108 may be placed over a camera 110 of the computing device display 104 to augment its field of view. In the depicted embodiment, the stand 106 is resting on the surface 102 and configured to receive the computing device into the opening(s) 136. The opening(s) 136 may be formed in upward-facing surface(s) of the stand 106 and may form a slot for inserting an edge portion of the computing device display 104 into. In some embodiments, the opening(s) 136 may extend into and may be formed at least partially by one or more inserts inserted into the stand 106, as discussed further herein. While two inserts (122a and 122b) are shown as inserted into opposing sides of the stand 106 in FIG. 3, other embodiments may include a single insert inserted into and extending across the stand 106, or more than two inserts that may be inserted into corresponding recess specifically included in the stand 106. In some cases, the inserts 122a and 122b may be simply referred to as 122.

In some embodiments, the inserts 122 may be slidably and horizontally inserted into the sides of the stand 106. For instance, the insert 122a and the insert 122b may be inserted into opposing sides of the stand 106 and the opening(s) 136 may expose retaining portions of the inserts 122a and 122b configured to receive, support, and retain a portion (e.g., an edge) of the computing display device 104 that is passed through the opening 136. As a further example, a rear lip of the opening 136 may support a rear side of the computing display device 104 and concavities respectively formed in the inserts 122a and 122b may support a surface of the edge portion of the computer display device 104 inserted therein.

Figure 4:
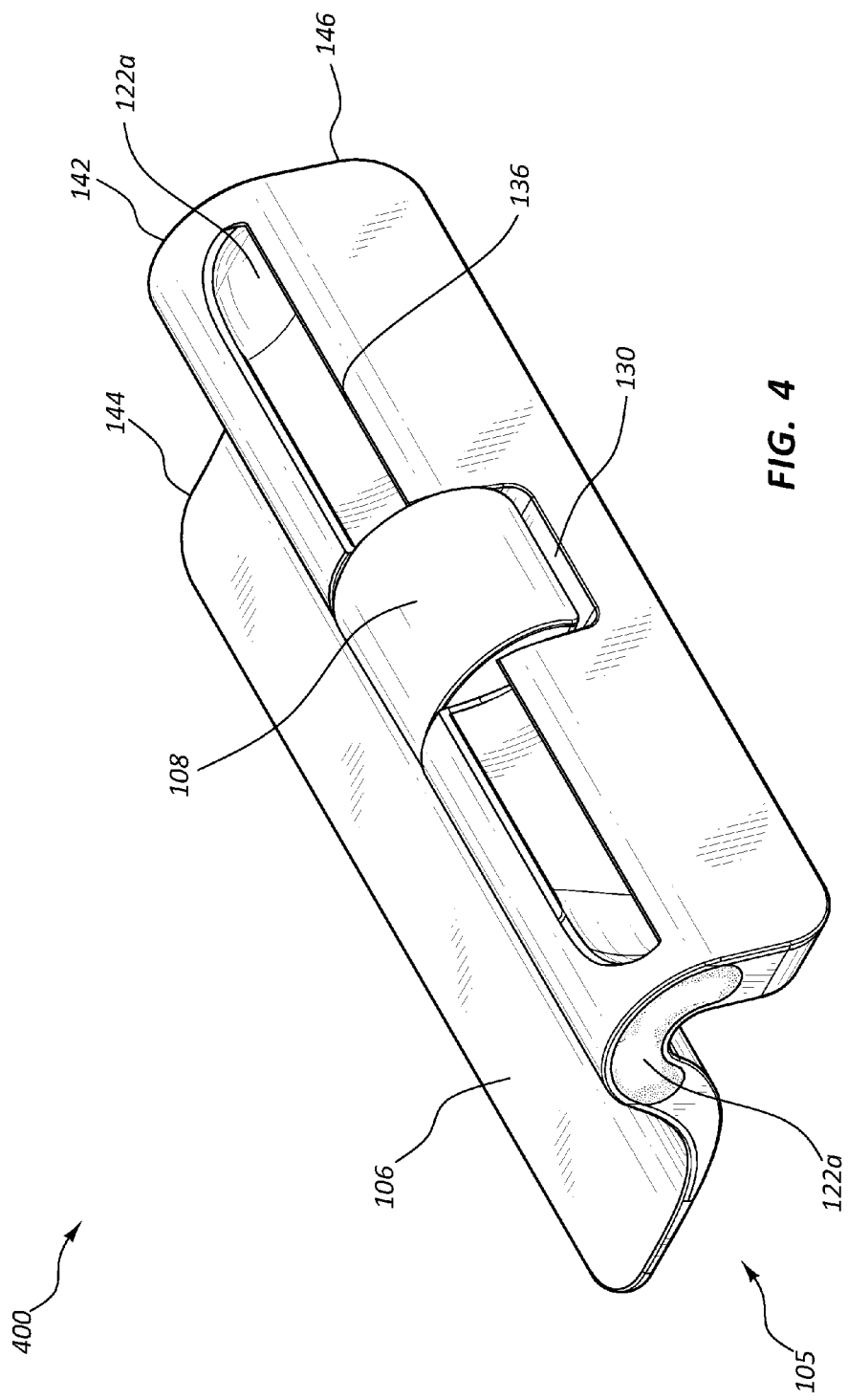
FIG. 4 illustrates a perspective view of various components of an example display positioning system assembled together as a kit.
Figure 5:
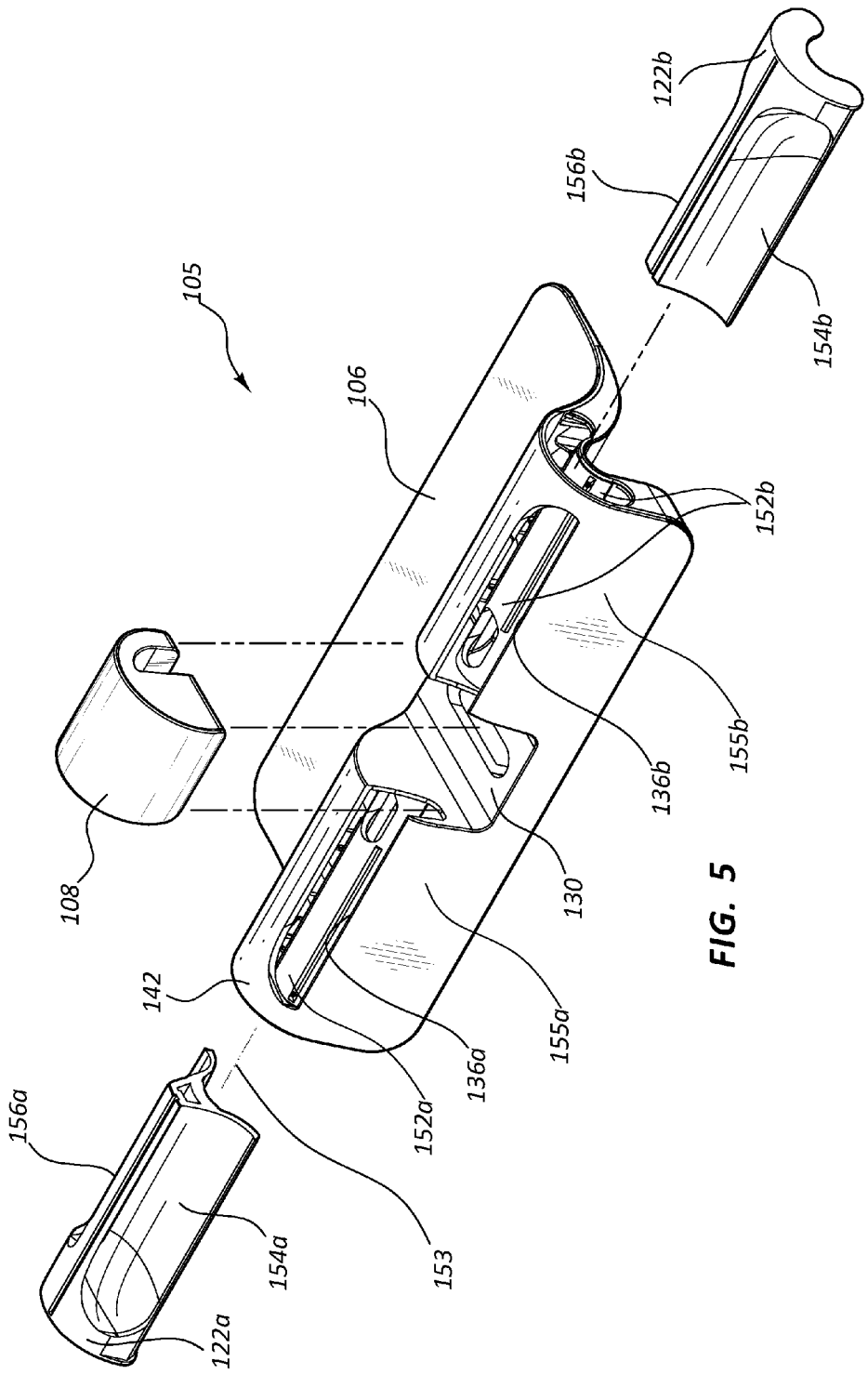
FIG. 5 illustrates an exploded view of an example display positioning system.
Figure 6:
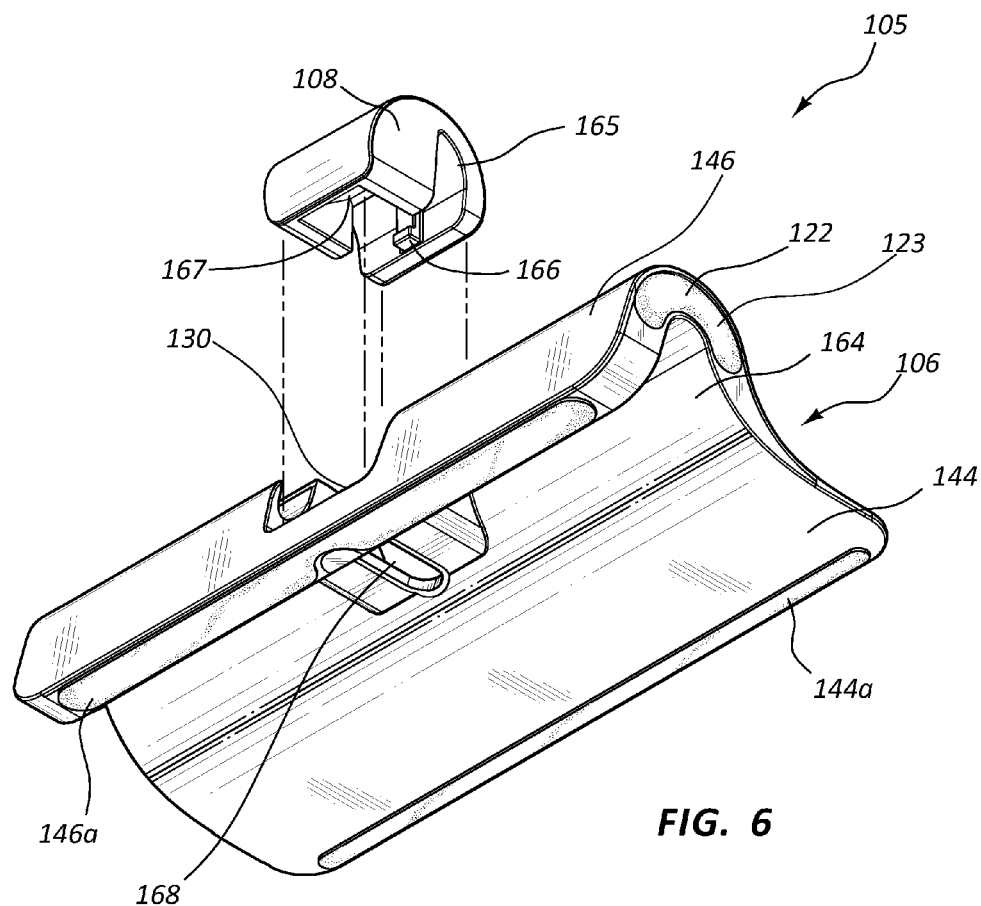
FIG. 6 illustrates an example display positioning system including a stand with inserts inserted into the stand and a camera adapter separated from the stand.

FIGS. 4-6 illustrate various perspective views an example display positioning system 105. FIG. 4 in particular shows an example display positioning system assembled together as a kit 400, which conveniently allows the display positioning system 105 to be compacted together for storage or transportation. FIGS. 5 and 6 illustrate an exploded and bottom perspective view of the example display positioning system 105.

As shown in FIG. 4, the stand 106 may include a display positioning portion (also referred to simply as the positioning portion) 142, a rear support 144, and a front support 146. The positioning portion 142 is configured to position and support computing device display 104. As illustrated and discussed further elsewhere herein, the positioning portion 142 includes opening(s) 136 in upward-facing surfaces configured to receive at least an edge portion of a computing device display 104.

The positioning portion 142 may include one or more housings for housing inserts 122. For instance, the positioning portion 142 may include a first housing 155a and a second housing 155b for housing inserts 122a and 122b, respectively, although other variations are also possible. For instance, in embodiments lacking an adapter receiver 130 or where the adapter receiver 130 is included elsewhere on the stand 106, the positioning portion 142 may include a single housing having one opening 136 and one or more recesses that accommodate one or more inserts 122, respectively.

In some embodiments, the first housing 155a includes a first surface having a first recess 152a and the recess 152a extends into the housing 155a so that the first housing 155a may accommodate the first insert 122a when it is slidably inserted into the housing 155a via the recess 152a. Similarly, the second housing 155b is included adjacent to the first housing 155a in the positioning portion 142 and includes a second surface on a side of the housing opposite to the first surface of the first housing 155a. The second surface includes a second recess 152b that extends into the surface and is configured to receive and removably retain a correspondingly shaped second insert 122b. The first insert 122a and the second insert 122b may each be configured to receive and removably retain a first and second edge of the display 104.

As shown, the positioning portion 142 may include one or more recesses 152, such as recesses 152a and 152b (which are also sometimes refereed to independently or collectively as 152), that are configured to receive and retain one or more inserts 122, such as inserts 122a and 122b. The inserts 122a and 122b are removable/electable from the recesses 152a and 152b, as shown in FIG. 5.

As shown, the recesses 152 may be formed at opposing ends of the positioning portion 142 (in housings 155a and 155b), and extend inward along the axis 153, although other variations are also possible and contemplated.

As previously noted, the stand 106 may include an adapter receiver 130 configured to receive and store the adapter 108. In some embodiments, the adapter receiver 130 may be formed by a channel passing through the positioning portion 142, such that when the adapter 108 is received within the adapter receiver 130 one or more edges of the adapter 108 are contiguous with one or more edges (e.g., an outer surface) of the stand 106. Although, it should be understood that the adapter receiver 130 could be connected to or formed within any portion of the stand or absent from the display positioning system 105 altogether. In some instances, the adapter receiver 130 may magnetically secure the adapter 108 in place to prevent the adapter 108 from being easily jarred out of the channel. For example, the adapter receiver 130 and the adapter 108 may include compatible magnetic materials configured to magnetically couple to one another.

In the depicted example, the inserts 122 may be inserted into the positioning portion 142 on sides opposite of the sides of the housings 155a and 155b respectively forming the sides of the adapter receiver 130). The housings 155a and 155b may be connected by a portion (e.g., a bottom surface) of the adapter receiver 130, which forms a bottom of the adapter receiver 130. Described another way, the positioning portion 142 may include a channel formed by and between a first housing 155a and a second housing 155b. A connecting portion forming a bottom surface of the channel connects the housings 155a and 155b.

Although two inserts 122a and 122b are illustrated, it should be understood that in further embodiments any number of inserts may be included and may be inserted or connected to the positioning portion 142 from any direction without departing from the subject matter of this disclosure. For example, a single insert could be inserted into the positioning portion 142 horizontally via a side of the stand 106, vertically via the top of the stand 106 (e.g., through the opening 136), etc.

In the embodiment depicted in FIG. 5, a least a portion the interior of the stand 106 inside the opening 136 is hollow to accommodate one or more inserts 122. In this particular embodiment, the housings 155a and 155b include recesses 152a and 152b, which are configured to receive. In other words, the recesses 152a and 152b are shaped to accommodate and correspond with the respective inserts 122a and 122b. The openings 136a and 136b allow at least an edge portion of a computing display device 104 to pass thorough to the inserts 112a and 122b when inserted into the recesses 152a and 152b As shown, the inserts 122a and 122b each include a front concavity 154a and 154b (also referred to herein simply as 154). In some embodiments, the inserts 122a and 122b may also each include a rear concavity 156a and 156b (also referred to collectively and separately as 156), respectively. The front concavity 154 and rear concavity 156 may be configured to support displays having various different shapes and/or dimensions. For example, the rear concavity 156 may be configured to receive a 10-inch tablet, while the front concavity 154 may be configured to receive an 8-inch tablet. Similarly, each concavity 154 and 156 may include multiple contours (e.g., as described in further detail at least in reference to FIG. 8), such that each concavity may support displays of various dimensions.

In some embodiments, the inserts 122 may be reversible and thus may be insertable in either recess 152 of the stand 106 depending on which display the stand is being equipped with. For example, as depicted in FIG. 5, the inserts 122a and 122b may be mirror images of one another, so that if insert 122a were inserted into recess 152a and insert 122b were inserted into recess 152b, the front concavities 154a and 154b would be accessible through the openings 136a and 136b, and therefore able to each support a corresponding corner portion of an edge of a computing display device 104. On the other hand, if the insert 122a were inserted into recess 152b and insert 122b were inserted into recess 152a, the rear concavity 156a would be accessible through the opening 136b and the rear concavity 156b would be accessible through opening 136a, and therefore able to cooperatively support corresponding corner portions of an edge of a differently shaped (e.g., size, dimensions, etc.) computing display device 104. In another example, an insert 122 could include one or more concavities along the top, bottom, or sides of the insert, such that if the insert 122 were rotated along an axis (e.g., length), a different concavity would be configured to support an edge portion of various shapes of displays 112.

The rear support 144 of the stand 106 may include one or more supports situated to provide stabilization to the positioning portion 142 and by extension, a computing device display 104 retained thereby. The rear support 144 may be integrally formed with the positioning portion 142, may be a separate component and attached to the positioning portion 142 using one or more fastening mechanisms (e.g., conventional fasteners, adhesive, welding, etc.), etc. In the depicted embodiment, the rear support 144 is elongated along the axis 153 and is connected to and extends outwardly from a rear side of the positioning portion 142. This variation allows the rear support 144 to provide stability to a reclined computer display device 104 that may have considerable weight and in which further pressure may be applied (e.g., by a user touching the touch screen 112). While the rear support 144 is shown as single, continuous member that flows downward and rearward from positioning portion 142, it should be understood that many other variations are possible, such as a rear support that comprises a plurality of legs protruding downwardly from the positioning portion 142, etc.

The front support 146 may be connected to a front side of the positioning portion 142 and configured to support and stabilize the positioning portion 142 in cooperation with the rear support 146. In some embodiments, the front support 146 extends downward and is located at least partially beneath the positioning portion 142 to avoid interfering with the field of view 103 (e.g., as depicted in FIG. 1) of the camera, which is situated in front of the stand 106. As with the rear support 144, the front support may take many different forms. Thus, while the front support 146 is depicted as a single, continuous member connected to and extending downwardly and forward from the positioning portion 142, the front support 146 may be formed by more than one component, include more than one leg support for the positioning portion 142, etc. In some instances, the front support is elongated in a direction parallel with the axis 153 and connected to the front side of the positioning portion 142. In further examples, the front support 146 may extend through the activity surface 103 and form a base of the activity surface, such as a game board. Numerous further variations are also contemplated.

In some embodiments, the front support 146 may include marks or structures for calibrating the camera 110. For example, a portion of the front support 146 may fall within the field of view of the camera 110, which portion the camera may use for calibration (e.g., white balance, alignment, geometric, exposure, zoom, focus, etc.). The supports 144 and 146 of the stand 106 may respectively include support pads 144*a* and 146*a* on a bottom-side as shown in FIG. 6 in particular. The support pads 144*a* and 146*a* may be configured to contact with and/or grip a support surface on which the stand 106 is place during use. This is advantageous as it prevents the stand from moving when the computer display device 104 is interacted with (e.g., tapped, swiped, etc.) by the user. For example, the support pads 162*a* and 162*b* may be rubberized and/or high friction pads that help prevent the stand 106 from sliding across a support surface. It should be understood that in further embodiments where the supports 144 and 146 have other configurations (e.g., the stand 106 includes more supports, one single integrated support, etc.), the support pads 162 may be configured differently to corresponding with the design of the supports.

Figure 10:
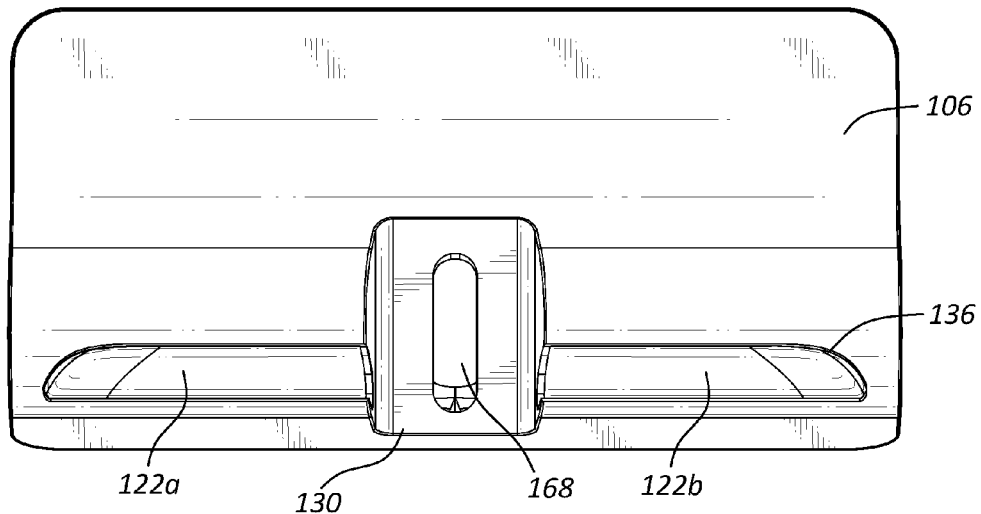
FIG. 10 illustrates a top-down view of an example stand.

The stand 106 in some embodiments may include passages or other mechanisms to allow for cables to pass through and connect to a computing display device 104 that is supported on the stand 106. As shown in FIGS. 6 and 10, the stand 106 may include an aperture 168 configured to allow a cable (e.g., data or power cable) to conveniently pass through the stand 106. In particular, the aperture 168 may be formed in a bottom surface of the adapter receiver 130 and extend therethrough, although other configurations are also possible and contemplated.

The positioning portion 142 depicted in the figures includes an arch 164 extending from the rear support 144 to the front support 146, which decreases the material used, and thus reduces the weight of the stand 106, which allows for increased portability and convenience for the user. In addition, the arch 164 allows for a cable to easily pass from the aperture 168 and along the arch 164 under the stand 106 to a charging or data port. Additionally, the inserts 122 may be correspondingly arch-shaped along its cross section to fit within the recesses 152 included in an apex of the arch 164. For example, as shown, the insert 122 may have an end surface 123 having an arch-like shape that is contiguous with a surrounding the surface of the stand 106 when inserted into the recess 152, although other embodiments are possible and contemplated herein.

Figure 14:
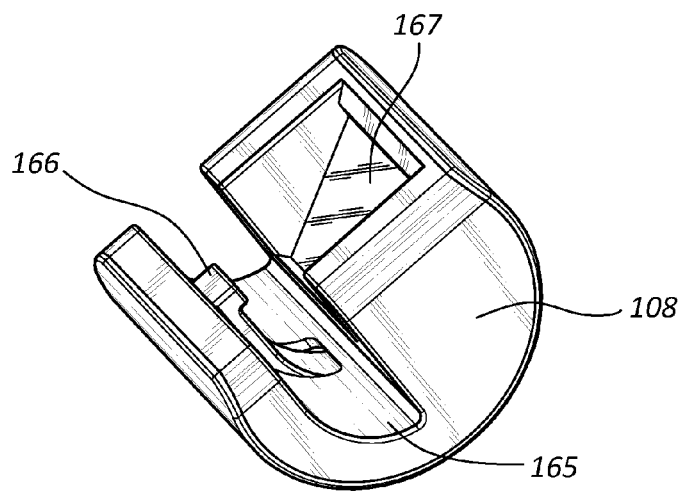
FIG. 14 illustrates a bottom-perspective view of an example camera adapter.

FIGS. 6 and 14 further show various aspects of the adapter 108. As depicted, the adapter 108 may include a mounting portion 165 for receiving (e.g., receiving, securing, gripping, connecting to, etc.) an edge of the computing device display 104 so as to cover at least a portion of the camera 110 (e.g., as shown in FIGS. 1 and 3). In some instances, the mounting portion 165 may include a clip 166 to grip the edge of a computing display device 104. For example, the clip 166 may be resilient (flexible, attached to a spring, etc.) in order to exert pressure on a computing display device 104 to retain the adapter 108 in place on the computing display device 104.

In some embodiments, the adapter 108 may include one or more optical elements 167 to adapt the standard field of view of the camera 110. For example, the optical elements may direct light from the activity surface 103 (e.g., as shown in FIG. 1) into a front or rear facing camera (e.g., a camera with a fixed line of sight with respect to the screen 112). The adapter 108 can be detachably connected to the device to cover the camera 110 and adapt the line of sight of the camera 110 so it can capture the activity surface 103, as described elsewhere herein. In another example, the optical elements 167 may include a flat mirror, curved mirror, split mirror, lens, prism, etc. to allow a different amount of a surface 102 (e.g., as in FIGS. 1-3) or a room to be within the field of view.

Figure 7:
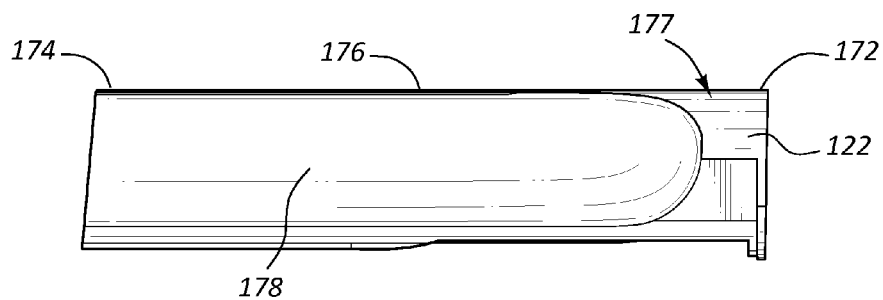
FIG. 7 illustrates a front view of an example insert.
Figure 8:
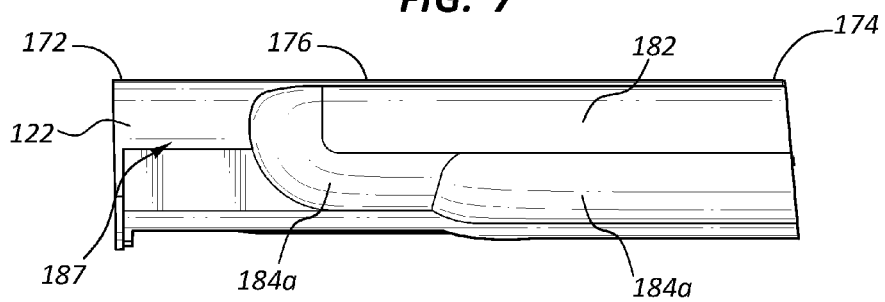
FIG. 8 illustrates a back view of an example insert.
Figure 9:
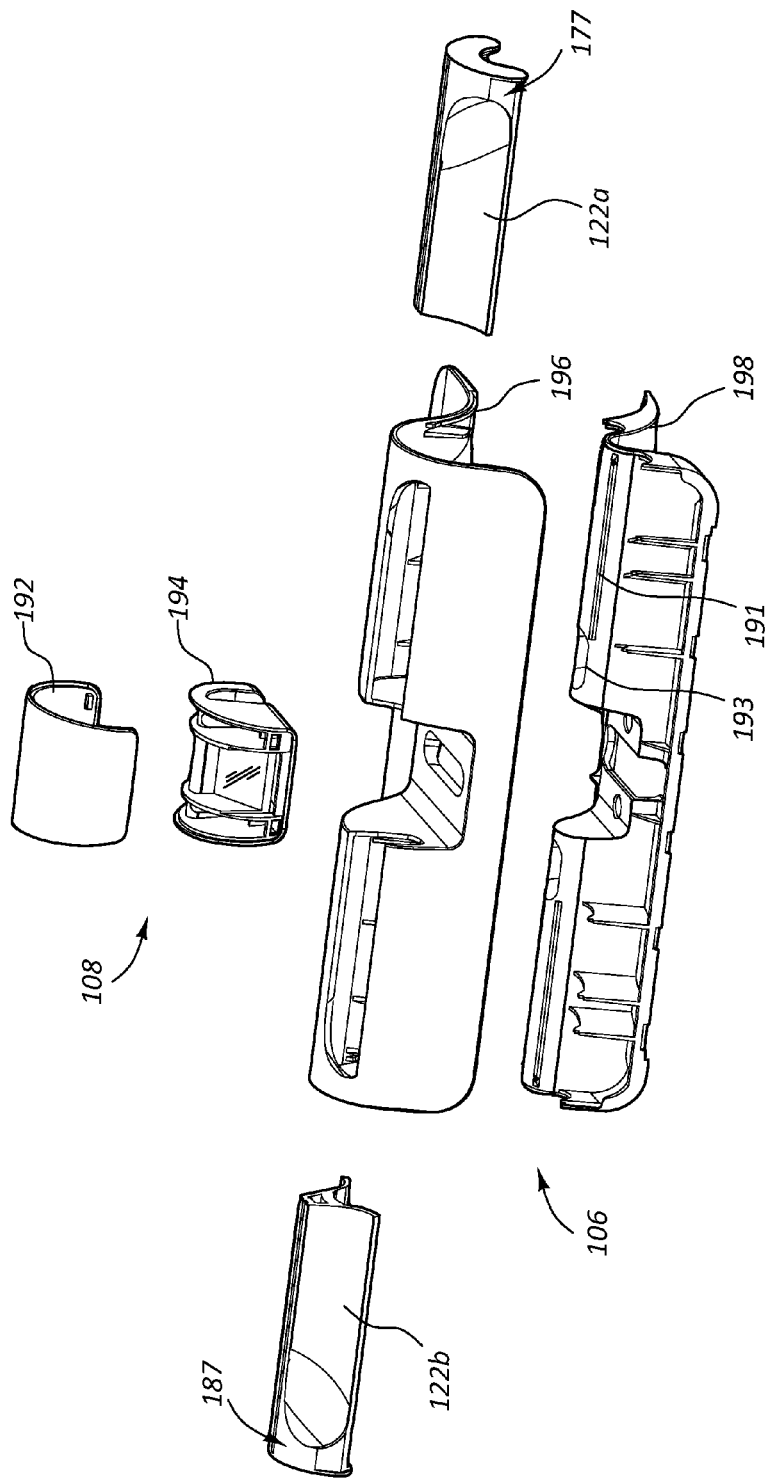
FIG. 9 illustrates an exploded view of example components of a display positioning system including a stand, inserts, and a camera adapter.

FIGS. 7, 8, 12, and 13 depict various views of an example insert 122. As shown, the insert 122 includes a proximal portion 172, a distal portion 174, an elongated body 176, and one or more concavities. The elongated body includes a first side 177 facing a first direction as shown in FIG. 7 and a second side 187 facing a second direction as shown in FIG. 8. The first side 177 and the second side 187 of the insert 122 comprise an upwardly facing surface 222 of the insert 122 relative to an underside of the insert 122. Depending on the orientation of the insert when it is inserted into the stand 106, the first side 177 may represent a front side or a rear side of the insert. This also applies to the second side 187. For instance, as shown in FIG. 9, the first side 177 represents the front side for insert 122*a* and the second side 187 represents the front side for insert 122*b*.

The first side 177 may include concavity 178 and the second side 187 may include concavity 182. In some embodiments, the concavity 178 may be formed in a front inclined surface of the first side 177 of the elongated body 176, which may extend from a proximal portion 172 of the elongated body 176 to a distal portion 174 of the elongated body 176. The concavity 182 may be formed in a rear inclined surface of the second side 187 of the elongated body 176. The front and rear inclined surfaces, and thus the first side 177 and the second side 187, face away from one another and extend adjacently from the proximal portion 172 to the distal portion 174. The front inclined surface and a rear inclined surface may be joined along a ridge of the upwardly facing surface 222.

It should also be understood that while insert 122 is depicted has having two concavities 177 and 182, the insert 122 may include a single concavity or three or more concavities, which may be formed at suitable locations on the insert 122.

As discussed in further detail elsewhere herein, as the insert 122 includes both a first concavity 178 and a second concavity 182, the concavities 178 and 182 may each be configured to support (e.g., receive, removably retain, stabilize, support the weight of, etc.) edge portions of differently shaped computer display devices 104. The first concavity 178 may include one or more contours designed to mate with the edge of a computing device display 104. For example, the concavities 178 and 182 may comprise the negative shape(s) of the portion of the surface(s) of the computer display device(s) 104 they are configured to mate with. By way of further example, the contours of the concavities 178 and 182 may support a bottom and lower back portion of a given computing display device 104. In addition, in some cases an inside surface (e.g., the lip(s)) of the opening(s) 136 may retain a front portion of the computing display device 104.

In some instances, the concavities 178 and 182 may include multiple contours each configured to receive and retain differently shaped displays. For example, as depicted in FIG. 8, the concavity 182 includes a first contour 184a configured to receive a computing display device 104 of a first shape and a second contour 184b configured to receive a computing display device 104 of a second shape. The contour 184a may be configured to accommodate a first type of computing device display 104 (e.g., a 10 inch tablet) while the contour 184b may be configured to accommodate a second type of computing device display 104 (e.g., an 8 inch tablet), and so forth.

It should be understood that the insert 122 depicted in at least FIGS. 7, 8, 12, and 13 illustrates one possible configuration, and that other configurations are possible and contemplated by this disclosure. Further, while the insert 122 is described has having an upwardly facing surface 222 that includes front and rear inclined surfaces, in other configurations the insert could be multi-faceted with a multiplicity of surfaces (e.g., three or more) and corresponding concavities. In further embodiments, an insert 122 may be rotatable and insertable into the stand 106 at different angles of rotation. For instance, the different faces of the insert may include different concavities and the user may select which concavity to align with the opening by rotating the insert before inserting it.

Figure 12:
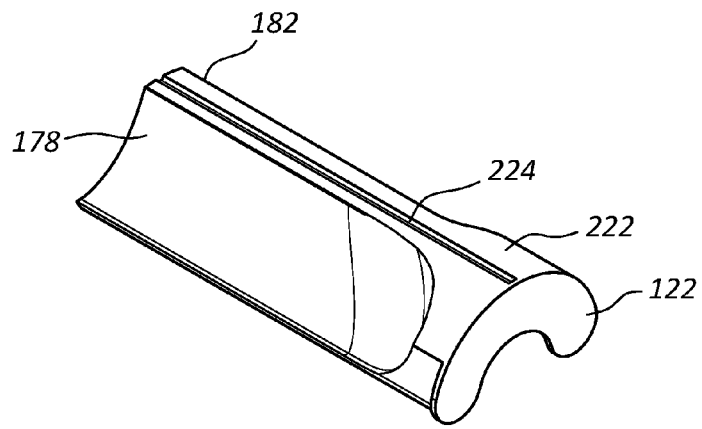
FIG. 12 illustrates a top-perspective view of an example insert.

As shown in at least FIG. 12, the insert 122 may include an alignment mechanism (e.g., a self-aligning mechanism) configured to align the insert within the stand 106. In some embodiments, the alignment mechanism may include one or more slots formed in a surface of the insert 122. In some instances, an elongated slot 224 may be formed within the upwardly facing surface 222 and configured to mate with a correspondingly shaped protrusion of the stand 106. In some instances, a plurality of elongated slots 224 may be formed in the surfaces of the insert 122, for example, the insert may include a single elongated slot 224 formed in the upwardly facing surface and one or more other alignment slots or mechanisms formed in other surfaces of the insert 122 (e.g., the alignment slot 234 illustrated in FIG. 13). It should be understood that other alignment mechanisms are possible. For example, the insert 122 could include a protrusion configured to mate with a corresponding slot on the stand 106, or the stand and/or insert could include some other suitable alignment mechanism configured to align the insert 122 when inserted into the stand 106, etc.

Figure 13:
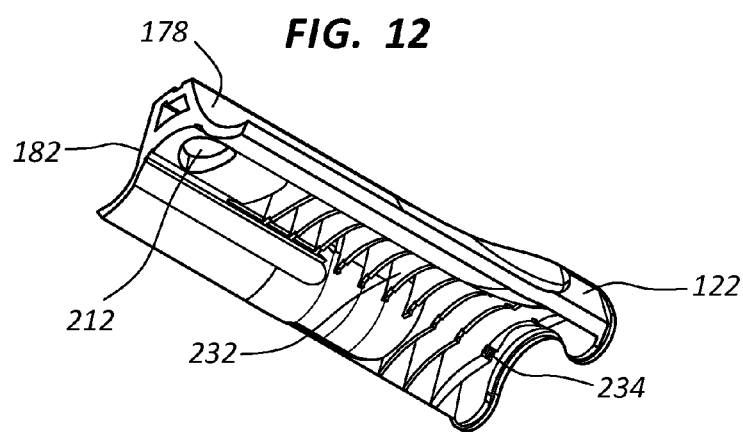
FIG. 13 illustrates a bottom-perspective view of an example insert.

As shown in FIG. 13, the insert 122 may be hollowed out to reduce weight and use of materials, but may include supports, such as support ribs 232 to provide strength to the insert 122. The underside (e.g., support ribs 232) of the insert 122 may additionally or alternatively include one or more alignment slots 234 formed therein to align the insert within the stand 106 by mating with a protrusion, such as the protrusion 191 depicted in FIG. 9.

Figure 11:
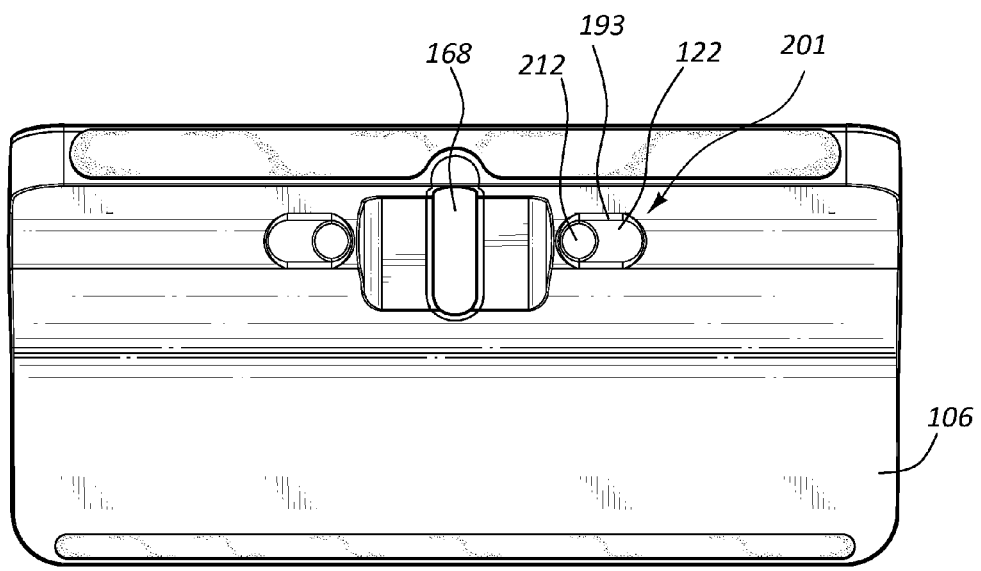
FIG. 11 illustrates a bottom-up view of an example stand.

In some embodiments, the insert 122 may include an ejector 212 to facilitate removal of the insert 122 from a stand 106. For instance, the ejector 212 may include a structure connected to or formed within the insert 122 to allow a user to grasp the insert 122 for removal from a stand 106. For example, as depicted in FIGS. 11 and 13, the ejector 212 may comprise an indentation formed in the insert 122. The ejector 212 is discussed in further detail in reference to at least FIG. 11.

FIG. 9 depicts an exploded view 900 including an example stand 106, adapter 108, and inserts 122a and 122b. As illustrated in the figure, the adapter 108 may be separable for weight, materials usage, and manufacturing purposes. For example, the adapter 108 may include a top adapter surface 192 and an adapter body 194. Similarly, the stand 106 may be separable (e.g., into a top stand surface 196 and a stand body 194), although in further embodiments the stand 106 may be a monolithic component. In some instances, the stand body 198 and/or the top stand surface 196 may include one or more protrusions 191 for aligning an insert 122 within the stand 106. For example, the insert 122 may include one or more slots (e.g., such as 224 in FIG. 12 or 234 in FIG. 13) to interface with the one or more protrusions 191 on the stand body 198. Specifically, the protrusion 191 may be configured to interact with the elongated slot 224 (e.g., as shown in FIG. 12) to align the insert 122 within the recess 152 (e.g., as shown in FIG. 5, for example. It should be understood that other alignment mechanisms are possible and contemplated herein and that the embodiment (e.g., consisting of protrusions and slots) depicted is merely for illustrative purposes and not intended to be limiting.

Additionally, the stand 106 may include all or part of an ejector configured to facilitate removal of the insert 122 from the stand 106. For example, the stand body 198 depicted in FIG. 9 may include a depression 193 (e.g., a cutout, formation, etc.), which is configured to allow an object (e.g., a finger, pencil, etc.) to pass through the stand body 198 to interact with an inserted insert 122, for example, to allow outward pressure to be applied to the insert 122.

FIGS. 10 and 11 illustrate various views of a stand 106 having an ejector mechanism and cord accommodations. As shown, the stand 106 may include openings 136, an ejector mechanism 201, an adapter receiver 130, and an aperture 168 formed in the adapter receiver 130. The adapter receiver 130 and aperture 168 are discussed in further detailed elsewhere herein. The ejector mechanism 201 includes an ejector depression (also referred to herein simply as depression) 193, which allows a portion of the insert 122 to be accessed through the depression 193 (e.g., by a finger, pencil, etc.) in order to eject the insert 122 from the stand 106. A portion of each of the inserts 122a and 122b can be seen in FIG. 10 through the openings 136. The insert 122 may include a structure (e.g., an indentation 212 as depicted in FIG. 13) formed in a bottom surface of the insert 122 which can be accessed through the depression 193 in order to eject the insert 122 from the stand 106. For example, a user may insert a finger, pencil, or other object through the depression 193 into the indentation 212, push the indentation 212 toward an edge of the stand 106, and then, once the an edge of the insert 122 has extended beyond an edge/outer surface of the stand 106, the user may grasp the insert 122 to completely or partially remove the insert 122.

Although the ejector mechanism 201 is depicted as including a depression 193 and an indentation 212, it should be understood that other types of ejector mechanisms are also possible and contemplated herein. For example, the ejector could comprise other apparatuses, such as a tab, slot, or indentation formed in the proximal portion of an insert 122; a ledge of the insert 122 visible through a depression such as depression 193, an opening 136, or otherwise; a spring-loaded latch; or various other types of actuators or insert removal mechanisms.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment", "an embodiment", "some embodiments", or "other embodiments" means that a particular feature, structure, or characteristic described in connection with the embodiment is included in at least one embodiment of the disclosure. The appearances of the term "embodiment" or "embodiments" in various places in the specification are not necessarily all referring to the same embodiment.

In some instances, various implementations may be presented herein including algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. The structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks.

Similarly, various physical structures and apparatuses are disclosed herein, including example embodiments of a display positioning system and its components discussed throughout this disclosure. It should be understood that the structures and apparatuses disclosed are presented merely as an example for clarity in explanation and other structures and apparatuses are possible and contemplated by the techniques of this disclosure. For example, although only a few embodiments of an insert are depicted in the figures and description of this disclosure, a person having ordinary skill in the art will understand that the disclosure contemplates other configurations.

It should be borne in mind, however, that all of these and similar terms are merely convenient labels applied to structures, apparatuses, components, and quantities. In addition, it should be understood and appreciated that variations, combinations, and equivalents of the specific embodiments, implementations, and examples may exist, are contemplated, and are encompassed hereby. The invention should therefore not be limited by the above described embodiments, implementations, and examples, but by all embodiments, implementations, and examples, and other equivalents within the scope and spirit of the invention as claimed.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the structures, components, apparatuses, applications, devices, and other aspects are not mandatory or significant, and the mechanisms that implement the specification or its features may have different names, divisions and/or formats.

What is claimed is:

1. A display positioning system comprising:
    a display stand including a positioning portion and supports connected to the positioning portion, the supports configured to cooperatively support the positioning portion when situated on a support surface, the positioning portion having a first recess; and
    a first insert including an elongated body configured to slidably insert into the first recess, the first recess configured to receive and removably retain the first insert and the first insert and the first recess being correspondingly shaped, the elongated body of the first insert including an upwardly facing surface having a first concavity shaped to receive and removably retain at least an edge portion of a first computing device display when the first insert is inserted into the first recess of the display stand and equipped with the first computing device display.

2. The display positioning system of claim 1, wherein the upwardly facing surface includes a front inclined surface and a rear inclined surface extending adjacently from a proximal portion of the elongated body to a distal portion of the elongated body, the front inclined surface and rear inclined surface facing away from one another.

3. The display positioning system of claim 2, wherein the front inclined surface includes the first concavity.

4. The display positioning system of claim 1, further comprising a self-aligning mechanism configured to automatically align the elongated body of the first insert within the first recess of the display stand when inserted.

5. The display positioning system of claim 4, wherein the self-aligning mechanism includes an elongated slot disposed in the upwardly facing surface of the elongated body, the first recess includes a protrusion, and the elongated slot is configured to mate with the protrusion when the first insert is inserted into the first recess.

6. The display positioning system of claim 1, wherein a surface of the first concavity includes multiple contours configured to receive and removably retain differently shaped computing device displays.

7. The display positioning system of claim 1, wherein the upwardly facing surface has a second concavity situated adjacent to the first concavity, the second concavity being configured to receive and removably retain a differently shaped computing device display than the first computing device display.

8. The display positioning system of claim 7, wherein the first insert is reversible such that either the first concavity or the second concavity may be positioned to receive and removably retain the edge portion of the first computing device display when the first insert is inserted into the positioning portion.

9. The display positioning system of claim 1, wherein a proximal portion of the elongated body is configured to be contiguous with an outer surface of the display stand when the first insert is completely inserted into the first recess.

10. The display positioning system of claim 1, further comprising a manually actuateable ejector for ejecting the first insert from the first recess.

11. The display positioning system of claim 1, wherein the positioning portion includes a first housing including a first surface having the first recess, the first recess extending into the first housing and the first housing accommodating the first insert when slidably inserted into the first housing via the first recess.

12. The display positioning system of claim 11, wherein the positioning portion includes a second surface on a side of the positioning portion opposite of the first surface, the second surface having a second recess configured to receive and removably retain a correspondingly shaped second insert having a second retainer configured to receive and removably retain at least a second edge portion of the first computing device display.

13. The display positioning system of claim 1, wherein the positioning portion includes a first housing and a second housing positioned adjacently, the first housing including a first surface on a first side and the second housing including the second surface on a second side, the first side and the second side being opposite sides of the positioning portion, and the first surface having the first recess.

14. The display positioning system of claim 13, wherein the positioning portion includes a channel formed between the first housing and the second housing, a bottom surface of the channel connecting the first housing and the second housing.

15. The display positioning system of claim 14, wherein the bottom surface of the channel includes a cable aperture configured to pass through a cable that connects to the first computing device display.

16. The display positioning system of claim 1, wherein the positioning portion further includes a second recess configured to receive and removably retain the first insert.

17. The display positioning system of claim 1, wherein the positioning portion is elongated along a first axis, the first recess extends into a first surface along the first axis, the supports include a front support elongated along the first axis and connected to a front side of the positioning portion, and a rear support elongated along the first axis and connected to and extending outwardly from a rear side of the positioning portion.

18. An insert comprising:
   an elongated body configured to slidably insert into a correspondingly shaped recess included in a surface of a display stand, the elongated body of the first insert including an upwardly facing surface; and
   at least a portion of the upwardly facing surface having a first concavity shaped to receive and removably retain at least an edge portion of a first computing device display when the insert is inserted into the recess of the display stand and equipped with the first computing device display.

19. The insert of claim 18, wherein the upwardly facing surface includes a front inclined surface and a rear inclined surface extending adjacently from a proximal portion of the elongated body to a distal portion of the elongated body, the front inclined surface and the rear inclined surface facing away from one another.

20. The insert of claim 19, wherein the front inclined surface or the rear inclined surface includes the first concavity.

21. The insert of claim 19, wherein the front inclined surface and the rear inclined surface meet along a ridge of the upwardly facing surface.

22. The insert of claim 18, further comprising a self-aligning mechanism configured to automatically align the elongated body of the insert within the recess of the display stand when inserted.

23. The insert of claim 22, wherein the self-aligning mechanism includes an elongated slot disposed in the upwardly facing surface of the elongated body and configured to mate with a corresponding protrusion of the display stand.

24. The insert of claim 18, wherein a surface of the first concavity includes multiple contours configured to receive and removably retain differently shaped computing device displays.

25. The insert of claim 18, wherein the upwardly facing surface has a second concavity situated adjacent to the first concavity, the second concavity being configured to receive and removably retain a differently shaped computing device display than the first computing device display.

26. The insert of claim 18, wherein a proximal portion of the elongated body is configured to be contiguous with an outer surface of the display stand when the insert is completely inserted into the recess.

27. The insert of claim 18, further comprising a manually actuateable ejector for ejecting the insert from the recess.

28. The insert of claim 27, wherein the ejector comprises an indentation formed in a surface of the elongated body.

29. A stand for positioning a computing device display on a support surface, the stand comprising:
   a positioning portion including a first surface having a first recess configured to receive and removably retain a correspondingly shaped first insert having a first concavity configured to receive and removably retain at least a first edge portion of the first computing device display; and
   supports connected to the positioning portion and configured to cooperatively support the positioning portion when situated on the support surface.

30. The stand of claim 29, wherein the positioning portion includes a first housing including the first surface, the first recess extending into the first housing and the first housing accommodating the first insert when slidably inserted into the first housing via the first recess.

31. The stand of claim 29, wherein the positioning portion includes a second surface on a side of the positioning portion opposite of the first surface, the second surface having a second recess configured to receive and removably retain a correspondingly shaped second insert having a second concavity configured to receive and removably retain at least a second edge portion of the first computing device display.

32. The stand of claim 29, wherein the positioning portion includes a first housing and a second housing positioned adjacently, the first housing including the first surface on a first side and the second housing including the second surface on a second side, the first side and the second side being opposite sides of the positioning portion.

33. The stand of claim 32, wherein the positioning portion includes a channel formed between the first housing and the second housing, a bottom surface of the channel connecting the first housing and the second housing.

34. The stand of claim 33, wherein the bottom surface of the channel includes a cable aperture configured to pass through a cable that connects to the first computing device display.

35. The stand of claim 33, wherein the channel embodies a camera adapter receiver for receiving and magnetically retaining a magnetic camera adapter.

36. The stand of claim 35, wherein at least one surface of one or more of the first housing, the second housing, and the bottom surface forming the channel includes a magnetic material configured to magnetically couple with a corresponding magnetic material included in the camera adapter.

37. The stand of claim 29, wherein the positioning portion is elongated along a first axis, the first recess extends into the first surface along the first axis, the supports include a front support elongated along the first axis and connected to a front side of the positioning portion, and a rear support elongated along the first axis and connected to and extending outwardly from a rear side of the positioning portion.

38. The stand of claim 29, wherein the positioning portion includes a manually actuateable ejector for ejecting the insert from the recess.

* * * * *